United States Patent
Wu et al.

(10) Patent No.: US 7,039,672 B2
(45) Date of Patent: May 2, 2006

(54) CONTENT DELIVERY ARCHITECTURE FOR MOBILE ACCESS NETWORKS

(75) Inventors: Tao Wu, Woburn, MA (US); Sadhna Ahuja, Waltham, MA (US); Sudhir Sharan Dixit, Weston, MA (US)

(73) Assignee: Nokia Corporation, Espoo (FI)

( * ) Notice: Subject to any disclaimer, the term of this patent is extended or adjusted under 35 U.S.C. 154(b) by 20 days.

(21) Appl. No.: 10/409,284

(22) Filed: Apr. 8, 2003

(65) Prior Publication Data

US 2003/0206520 A1 Nov. 6, 2003

Related U.S. Application Data

(60) Provisional application No. 60/380,158, filed on May 6, 2002.

(51) Int. Cl.
 *G06F 15/16* (2006.01)
(52) U.S. Cl. .................. 709/201; 709/203; 709/218; 709/219; 455/3.03; 455/412.1; 711/113; 711/126
(58) Field of Classification Search ............... 709/203, 709/217–219, 316, 201; 711/113, 126; 455/3.03, 455/412.1
See application file for complete search history.

(56) References Cited

U.S. PATENT DOCUMENTS

| | | | |
|---|---|---|---|
| 5,987,233 A | | 11/1999 | Humphrey |
| 6,253,234 B1 * | | 6/2001 | Hunt et al. ................. 709/213 |
| 6,434,609 B1 * | | 8/2002 | Humphrey ................... 709/218 |
| 6,657,954 B1 * | | 12/2003 | Bird et al. ................... 370/229 |
| 2001/0025248 A1 | | 9/2001 | Nihei |
| 2002/0154887 A1 * | | 10/2002 | Lu ............................... 386/35 |

(Continued)

FOREIGN PATENT DOCUMENTS

EP 0999656 * 5/2000

(Continued)

OTHER PUBLICATIONS

Hilmar Linder, Horst D. Clausen, Bernhard Collini-Nocker; *Broadband Direct to Home/User Wireless Systems—Satellite Internet Services Using DVB/MPEG-2 and Multicast Web Caching*; IEEE Communications Magazine; Jun. 2000; pp. 156-161; IEEE.

(Continued)

*Primary Examiner*—Saleh Najjar
*Assistant Examiner*—Oanh Duong
(74) *Attorney, Agent, or Firm*—Alston & Bird LLP

(57) ABSTRACT

Systems and methods are provided for delivering content in a communications system. A communications system is provided that includes a plurality of terminals and a content director. The terminals are adapted to communicate via a communications network, and are each capable of requesting and thereafter receiving content via the communications network. The content director, on the other hand, is capable of receiving a request for content from one terminal. The content director can then push the content to the terminal based upon the request, and push the content to at least one other terminal before the other terminals request the content. Each terminal can have an associated user interest correlation with each other terminal. In such instances, the content director can push the content to other terminals based upon the user interest correlation of the other terminals with respect to the terminal requesting the content.

29 Claims, 6 Drawing Sheets

U.S. PATENT DOCUMENTS

| | | | |
|---|---|---|---|
| 2002/0173309 A1* | 11/2002 | Shahidi et al. | 455/442 |
| 2002/0184403 A1* | 12/2002 | Dahlin et al. | 709/316 |
| 2003/0087652 A1* | 5/2003 | Simon et al. | 455/466 |
| 2003/0126232 A1* | 7/2003 | Mogul et al. | 709/219 |
| 2003/0143982 A1* | 7/2003 | Wolters et al. | 455/414 |

FOREIGN PATENT DOCUMENTS

| | | |
|---|---|---|
| WO | WO 01/67296 A2 | 9/2001 |
| WO | WO 01/67296 A3 | 9/2001 |
| WO | WO 02/03628 A2 | 1/2002 |
| WO | WO 03/003138 A2 | 1/2003 |

OTHER PUBLICATIONS

Azer Bestavros; *Speculative Data Dissemination and Service to Reduce Server Load, Network Traffic and Service Time in Distributed Information Systems*; Feb. 1996; pp. 180-187; Proceedings of the Twelfth International Conference ; IEEE Computer Society, US; XP010158914.

Joe Touch, Amy S. Hughes; *LSAM proxy cache: a multicast distributed virtual cache*; Nov. 1998; pp. 2245-2252; vol. 30, No. 22-23; Computer Networks and ISDN Systems, North Holland Publishing, Amsterdam, Netherlands; XP004152175.

* cited by examiner (a) EXPECTED ROUND-TRIP LATENCY (b) ACME'S ACCELERATION OVER BASELINE

CONTENT DELIVERY ARCHITECTURE FOR MOBILE ACCESS NETWORKS

CROSS-REFERENCE TO RELATED APPLICATIONS

The present application claims priority from U.S. Provisional Patent Applications Ser. No. 60/380,158, entitled: EDGE CONTENT DISTRIBUTION IN MOBILE ACCESS NETWORKS, filed on May 6, 2002, the contents of which are incorporated herein by reference in its entirety.

FIELD OF THE INVENTION

The invention generally relates to mobile access networks and, more particularly, relates to systems and methods for content delivery in mobile access networks.

BACKGROUND OF THE INVENTION

Data-capable 2.5G and 3G mobile networks that are currently being deployed worldwide will enable many new Web applications with mobility features, as well as extend existing wireline Web applications and content to mobile terminals. Ensuring consistent mobile Web performance is critical because satisfactory user experience is key to the success of these emerging networks. Achieving this goal, however, is uniquely challenging.

First, mobile access networks are generally characterized by an error-prone air interface and, consequently, a high packet-corruption rate. In this regard, link-layer retransmissions of corrupted packets are usually required to provide the reliability that most data applications require. These procedures, however, create long and unpredictable latency and severely affect application performance and user experience, especially in heavily loaded networks where strong interference causes the bit error-rate to increase dramatically. For example, it has been shown that the ping round-trip time from a terminal to a Web server (i.e., the time required to transmit a packet of information from a terminal to a designated Web server and receive a response from the server) increased by more than 20 times when a wireline link was replaced by an emulated, heavily loaded General Packet Radio Services (GPRS) link.

Furthermore, mobile Web applications are usually highly asymmetric in bandwidth usage in that they require much more downlink bandwidth than uplink bandwidth. Unfortunately, most existing and emerging mobile networks allocate uplink and downlink bandwidth symmetrically. This mismatch between applications and the underlying network architecture can easily deplete the downlink bandwidth in these networks. As a result, excessive queuing delay and packet loss in the downlink can contribute to unacceptable latency.

In wireline Internet applications, performance can usually be substantially enhanced by using additional bandwidth, which is often available at low cost. This approach, however, is generally impractical for mobile networks. In this regard, most mobile networks have a fixed spectrum, and the achievable data rate is fundamentally limited by interference and noise, as dictated by information theory.

Content delivery has been quite effective in scaling the Internet backbone with the rapid growth of World Wide Web traffic. By using Web caches at the "edge" of the network (e.g., at the access network, where LAN (local area network) traffic is aggregated) to store and serve popular Web content, content delivery reduces the usage of Internet backbone, and significantly enhances Web performance and user experience. In this regard, usage of Internet backbone was often the bottleneck on the end-to-end path during the first few years of the Web's existence. Directly applying wireline content delivery techniques in mobile access networks, however, provides only a limited quality of service improvement beyond conventional client browser caching. In contrast to the Internet backbone bottleneck, and as indicated above, the performance bottleneck of mobile Web applications is at the air interface, so user-perceived latency cannot be effectively improved even if content is cached and served from the access network (the "edge" in traditional content delivery).

SUMMARY OF THE INVENTION

In light of the foregoing background, embodiments of the present invention provide improved systems and methods for the delivery of content to terminals over a communications system. Embodiments of the present invention are capable of performing edge caching, which is a superset of client caching, by storing popular content requested by all users. To implement this functionality at the terminals, embodiments of the present invention are capable of pushing content requested by one terminal to other terminals before the other terminals request the content such that the other terminals can cache it for future references. By serving more content from the cache in the terminal, embodiments of the present invention substantially reduce radio resource usage and interference in the air interface, and provide reduced user perceived latency. Similarly, embodiments of the present invention reduce downlink traffic, mitigate the mismatch between network architecture and application characteristics, and improve dynamic network hot spots generated by user mobility. In other embodiments, to improve terminal power efficiency, the system of the present invention is capable of transmitting, or multicasting, content only to selected users, based upon a user interest correlation. In this regard, embodiments of the present invention exploit the user interest correlation and selectively multicast content only to users who are most likely to request it in the future.

According to one aspect of the present invention, a communications system is provided that includes a plurality of terminals and a content director. The terminals are adapted to communicate via a communications network, and are each capable of requesting and thereafter receiving content via the communications network. The content director, on the other hand, is capable of receiving a request for content from one terminal. The content director can then push the content to the terminal based upon the request, and push the content to at least one other terminal before the other terminals request the content. More particularly, each terminal can include a cache for storing data. In this regard, each terminal is capable of retrieving the content from cache when the content is stored in the cache of the respective terminal. When the content is not stored in cache, however, the terminal is capable of transmitting a request for content. An origin server can then receive the request from the terminal, and thereafter transmit the requested content through to the content director such that the content director can push the content to the terminal based upon the request, and push the content to at least one other terminal before the other terminals request the content.

Each terminal can have an associated user interest correlation with each other terminal. In such instances, the content director can push the content to at least one other terminal based upon the user interest correlation of the other terminals with respect to the terminal requesting the content. The content director can also be capable of creating a user interest correlation for each terminal with respect to each other terminal, where the user interest correlation is created based upon content requested by the respective terminal. More particularly, the content director can create a user interest correlation based upon content requested by the respective terminal by receiving and/or creating Web access traces from content requested by the respective terminal to thereby determine the content requested by the respective terminal. The content director can be capable of creating the user interest correlation for each terminal with respect to each other terminal by computing a probability, such as a conditional access probability, of the terminal requesting content after each other terminal requests the content.

The content director can be adapted to push the content to at least one other terminal that has a user interest correlation with respect to the terminal requesting the content that meets a predefined threshold. Then, when utilization of the communications network increases, the content director can decrease the predefined threshold. In various other embodiments, the content director can be capable of delivering the content to at least one other, active terminal. Additionally, or alternatively, the content director can be capable of delivering the content to at least one other terminal based upon a power condition of the at least one other terminal. Further, the content director can be capable of delivering the content to at least one other terminal when the other terminal initiates an activity on the communications network.

A method of delivering content over a communications system is also provided. Therefore, embodiments of the present invention provide improved systems and methods of delivering content over a communications system. Embodiments of the present invention are capable of performing edge caching, such as by transmitting, or broadcasting, content requested by one terminal to other terminals before the other terminals request the content such that the other terminals can cache it for future references. By serving more content from the cache in the terminal, embodiments of the present invention substantially reduce radio resource usage and interference in the air interface, and provide reduced user perceived latency. Embodiments of the present invention are also capable of reducing downlink traffic, mitigating the mismatch between network architecture and application characteristics, and improving dynamic network hot spots generated by user mobility. In instances including the user interest correlation, embodiments of the present invention also provide improved terminal power efficiency over conventional systems and methods. Therefore, the systems and methods of embodiments of the present invention solve the problems identified by prior techniques and provide additional advantages.

BRIEF DESCRIPTION OF THE DRAWINGS

Figure 1:
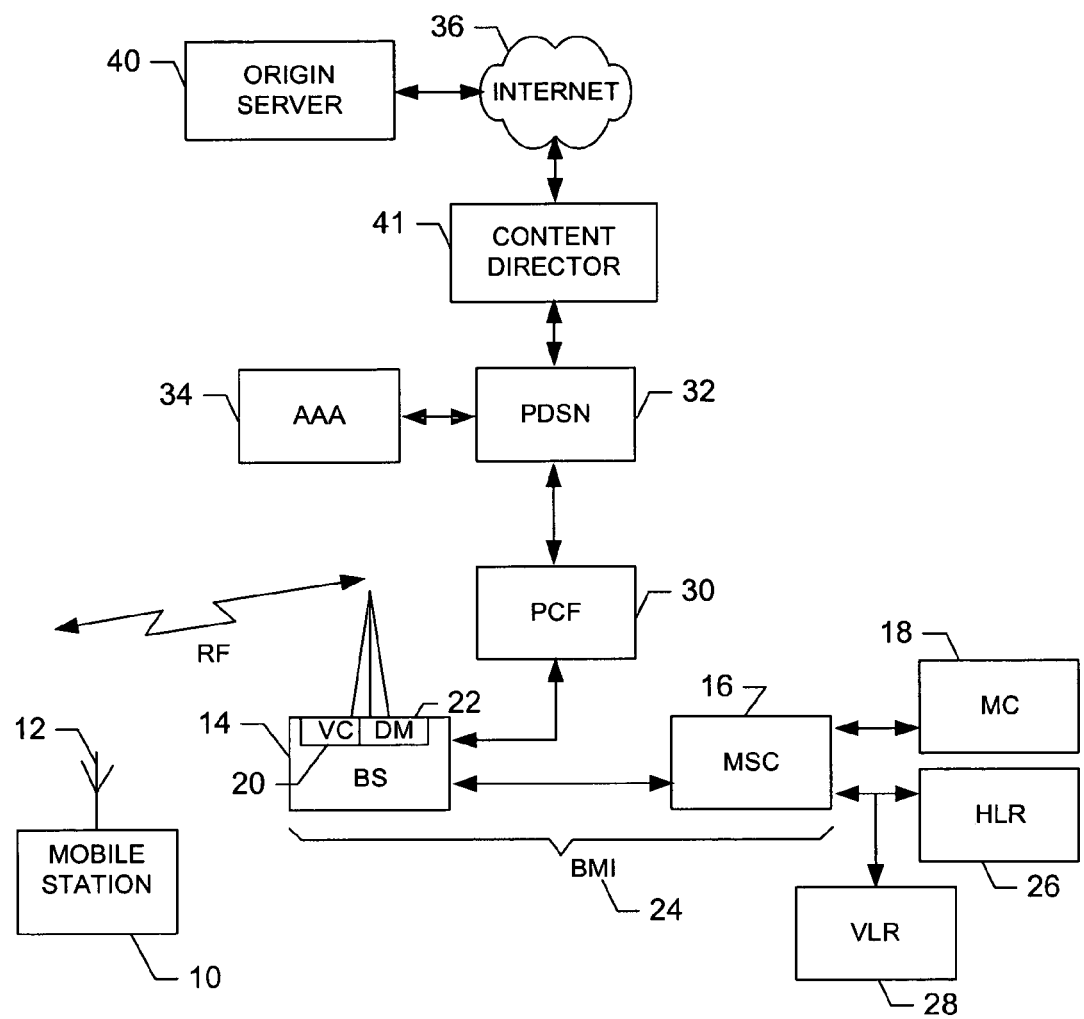
Figure 2:
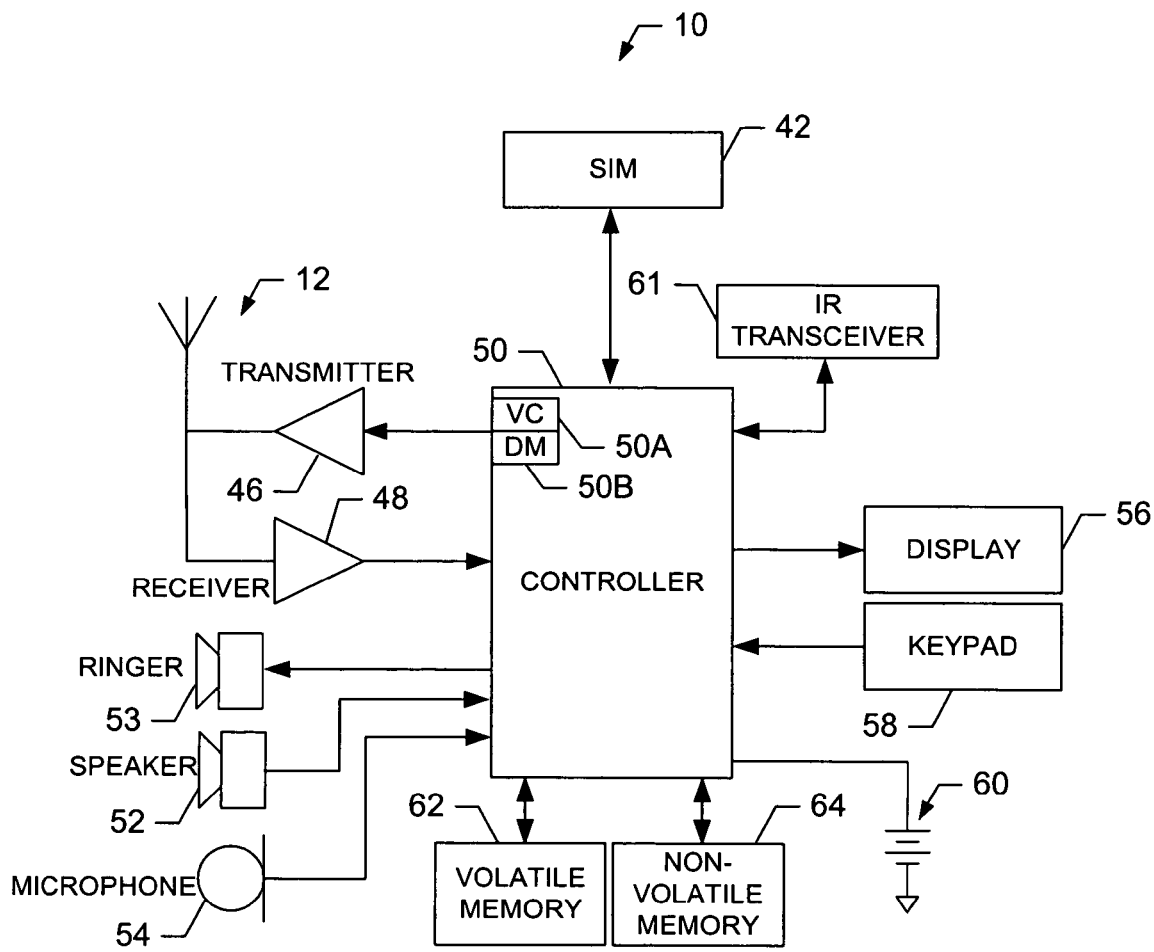
Figure 3:
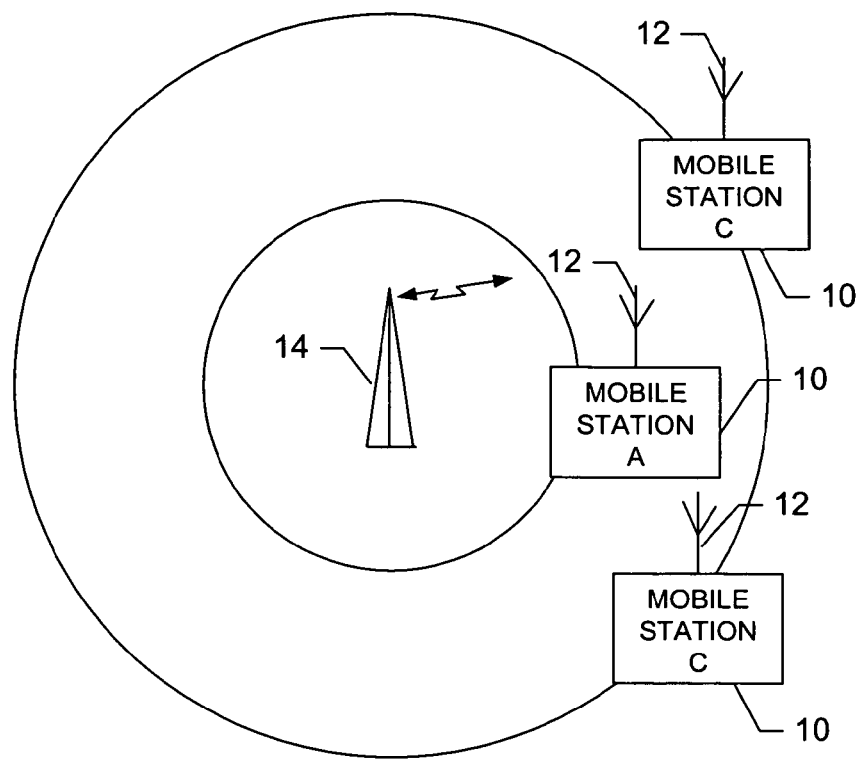
Figure 4:
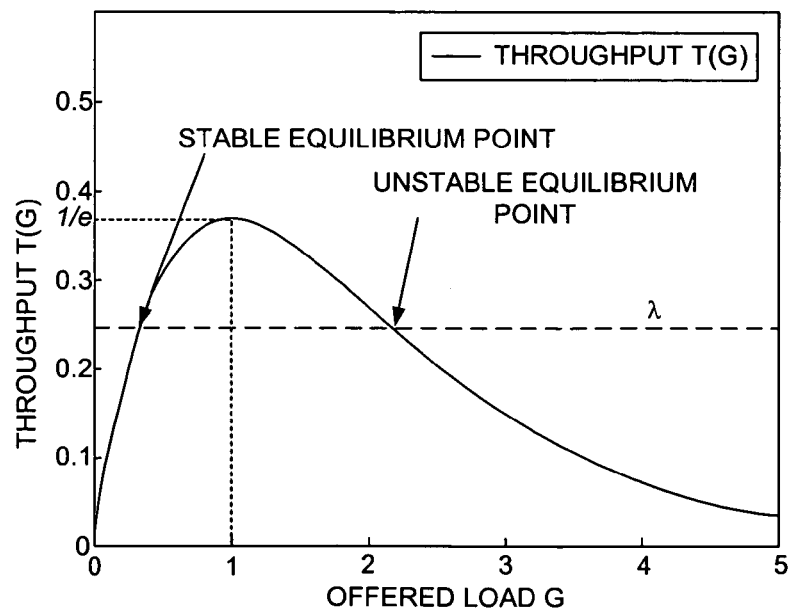
Figure 5A:
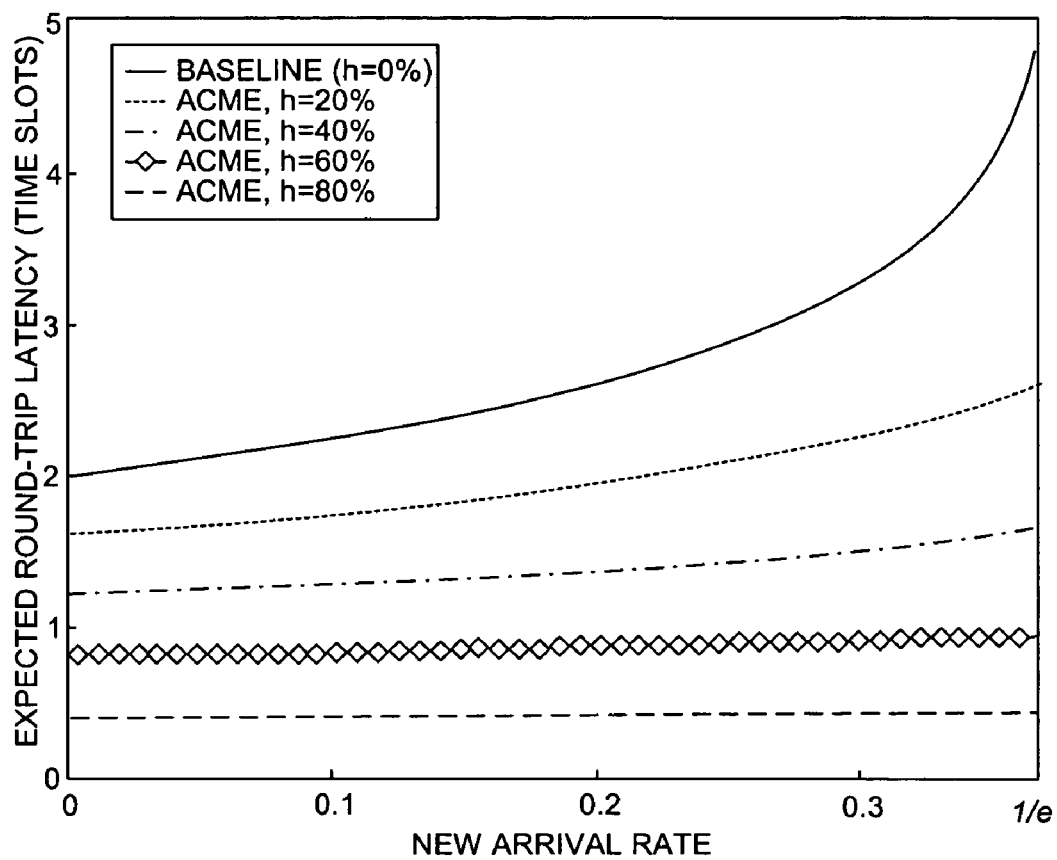
Figure 5B:
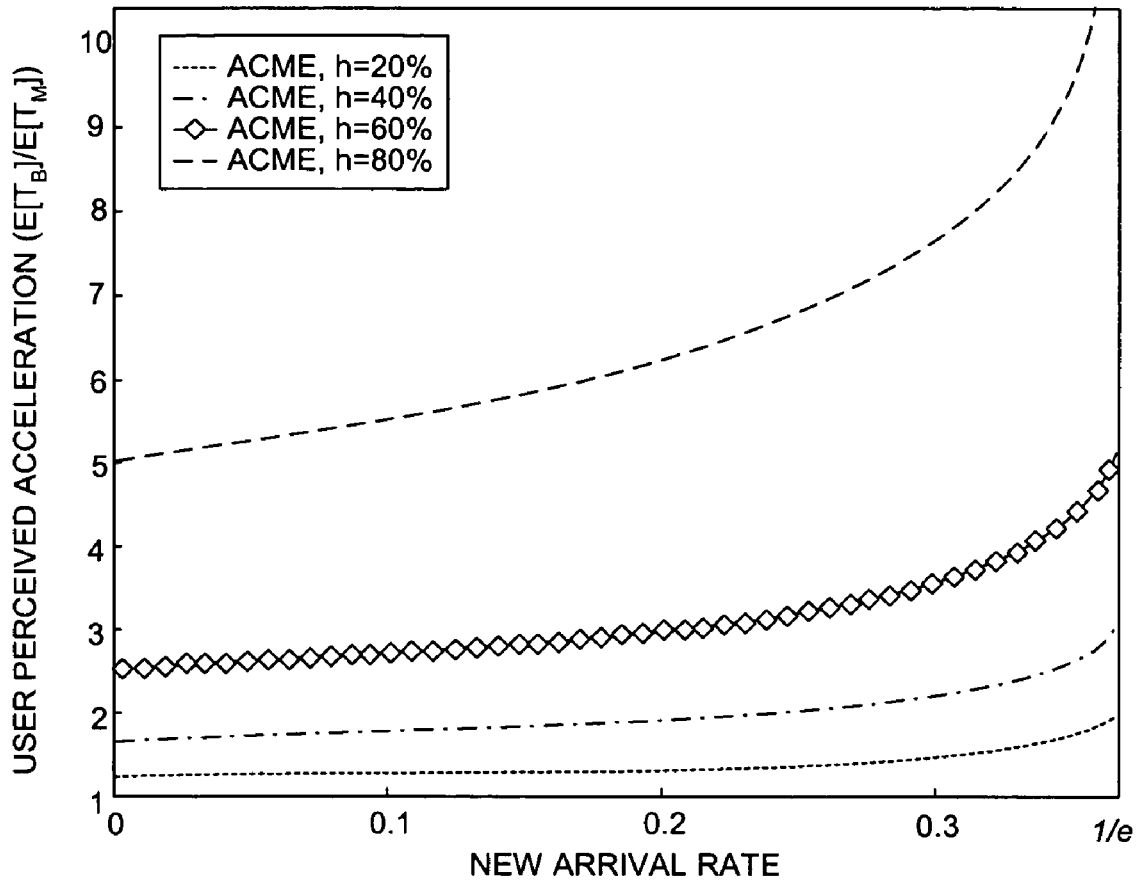
Figure 6:
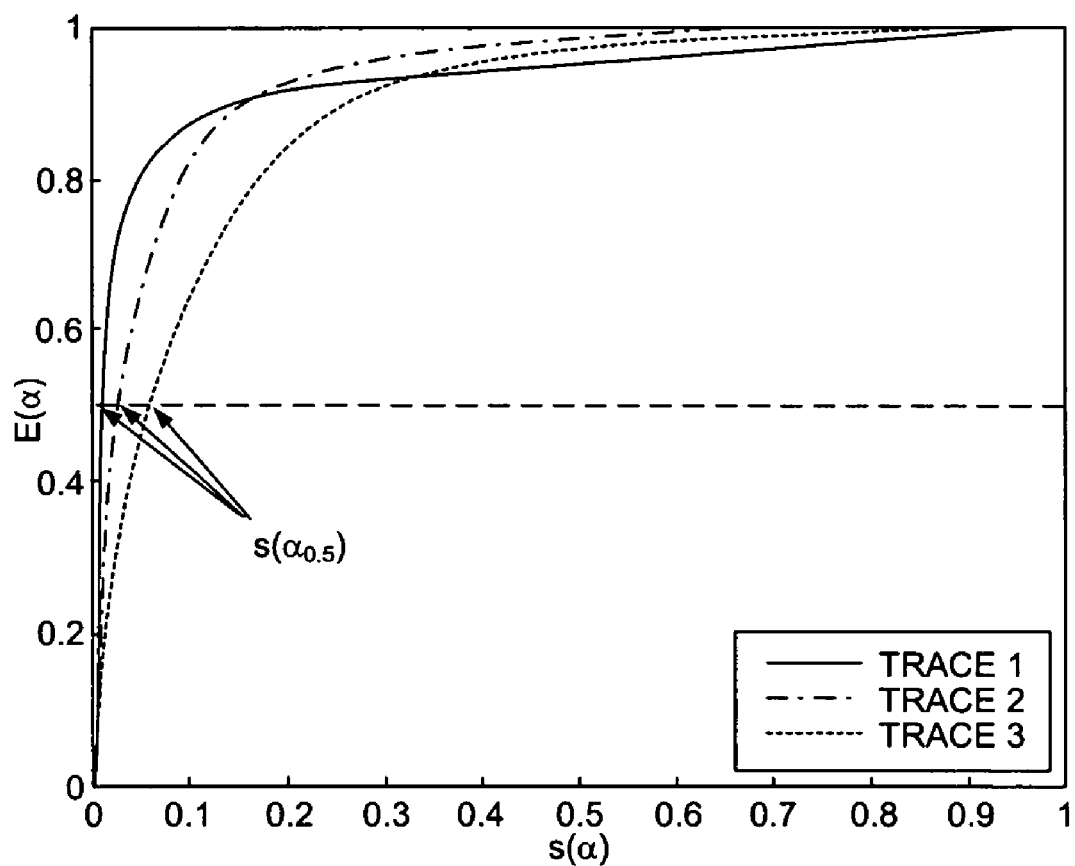

Having thus described the invention in general terms, reference will now be made to the accompanying drawings, which are not necessarily drawn to scale, and wherein:

FIG. 1 is a schematic block diagram of a wireless communications system according to one embodiment of the present invention including a cellular network and a data network to which the mobile station is bi-directionally coupled through wireless RF links;

FIG. 2 is a schematic block diagram of a mobile station according to one embodiment of the present invention;

FIG. 3 is a schematic diagram illustrating a wireless communications system including mobile stations A, B and C within the same sector of the cell serviced by a base station;

FIG. 4 is a graph illustrating throughput of a slotted ALOHA system as a function of total offered load;

FIG. 5A is a graph illustrating the expected round-trip latency for one embodiment of the present invention and for a conventional communications system against different new arrival rates;

FIG. 5B is a graph illustrating user-perceived acceleration at different hit ratios according to one embodiment of the present invention and a conventional communications system; and FIG. 6 is a graph illustrating the effectiveness $E(\alpha)$ of the system of one embodiment of the present invention against relative multicast group size $s(\alpha)$ by varying $\alpha$ from 0 to 1 for three Web access traces.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIGS. 1 and 2, an illustration of one type of wireless communications network including a terminal, such as a mobile station, that would benefit from the present invention is provided. It should be understood, however, that the mobile telephone illustrated and hereinafter described is merely illustrative of one type of mobile station that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, personal computers equipped with appropriate network cards or modems for radio access, and other types of wireline and wireless voice and text communications systems, can readily employ the present invention. Moreover, the system and method of the present invention will be primarily described in conjunction with mobile communications applications. But the system and method of the present invention can be utilized in conjunction with a variety of other applications, both in the mobile communications industries and outside of the mobile communications industries.

As shown, the mobile station 10 includes an antenna 12 for transmitting signals to and for receiving signals from a base site or base station (BS) 14. The base station is a part of a cellular network that includes a mobile switching center (MSC) 16, a message center (MC) 18, voice coder/decoders (vocoders) (VC) 20, data modems (DM) 22, and other units required to operate the network. The MSC is capable of routing calls and messages to and from the mobile station when the mobile station is making and receiving calls. As indicated above, the cellular network may also be referred to as a Base Station/MSC/Interworking function (BMI) 24. The MSC controls the forwarding of messages to and from the mobile station when the station is registered with the network, and also controls the forwarding of messages for the mobile station to and from the MC. Such messages may include, for example, voice messages received by the MSC from users of Public Switched Telephone Network (PSTN) telephones, and may also include Short Message Service (SMS) messages and voice messages received by the MSC from the mobile station or other mobile terminals serviced by the network.

Subscriber data of a mobile station 10 is stored permanently in a Home Location Register (HLR) 26 of the system and temporarily in the Visitor Location Register (VLR) 28 in the area of which the mobile station is located at a given moment. In this regard, the VLR contains selected administrative information necessary for call control and provision of the subscribed services for each mobile station currently located in the geographical area controlled by the VLR. Although each functional entity can be implemented as an independent unit, manufacturers of switching equipment generally implement the VLR together with the MSC 16 so that the geographical area controlled by the MSC corresponds to that controlled by the VLR, thus simplifying the signaling required. As such, the MSC and VLR will collectively be referred to herein as the MSC/VLR.

The cellular network, and thus the mobile station 10, can be coupled to a data network. For example, the base station BS 14 can be connected to a packet control function (PCF) 30, which is in connection with a Packet Data Serving Node (PDSN) 32. The PDSN is preferably connected to an AAA server 34, which provides Authentication, Authorization, and Accounting services. The AAA server can comprise a Remote Access Dialup User Service (RADIUS) server, as will be appreciated by those skilled in the art. The PDSN can also be connected to a wide area network, such as the Internet 36. In turn, devices such as processing elements (e.g., personal computers, server computers or the like) can be coupled to the mobile station via the PDSN. For example, the processing elements can include one or more processing elements associated with one or more origin servers 40.

As also illustrated in FIG. 1 and described more fully below, a content director 41 is typically connected between the Internet 36 and the PDSN 32. By directly or indirectly connecting both the mobile station 10 and the other devices to the PDSN and the Internet, the mobile station can communicate with the other devices, such as according to the Internet Protocol (IP) specification, to thereby carry out various functions of the mobile station. Then, by connecting the content director between the Internet and the mobile station, the content director can control the dissemination of content to the mobile station, as well as other mobile stations and devices, as described below.

Content can comprise data, information or the like requested by and/or transmitted to the mobile station 10. As will be appreciated, content is typically transmitted to mobile stations along with data specific to the respective mobile stations, such as packet header information. In this regard, when a mobile station requests content, and the content is transmitted to the mobile station as well as other mobile stations in accordance with embodiments of the present invention, the content is transmitted to the other mobile stations along with data specific to the respective other mobile stations, as opposed to data specific to the requesting mobile station. For example, when a mobile station requests content, the content can be transmitted to the mobile station along with data, such as packet header information, specific to the requesting mobile station. If the content is also transmitted to other mobile stations, then, the content is transmitted to the other mobile stations along with data specific to the respective other mobile stations.

Reference is now drawn to FIG. 2, which illustrates a block diagram of a mobile station 10 that would benefit from the present invention. The mobile station includes a transmitter 46, a receiver 48, and a controller 50 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first, second and/or third-generation communication protocols or the like. For example, the mobile station may be capable of operating in accordance with second-generation (2G) wireless communication protocols IS-136 (TDMA), GSM, and IS-95 (CDMA). Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 50 includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 50A, and may include an internal data modem (DM) 50B. Further, as described more fully below, the controller 50 includes the functionality to store Web content received by the mobile station in accordance with embodiments of the present invention.

The mobile station 10 also comprises a user interface including a conventional earphone or speaker 52, a ringer 53, a microphone 54, a display 56, and a user input interface, all of which are coupled to the controller 50. The user input interface, which allows the mobile station to receive data, can comprise any of a number of devices allowing the mobile station to receive data, such as a keypad 58, a touch display (not shown) or other input device. In embodiments including a keypad, the keypad includes the conventional numeric (0–9) and related keys (#, *), and other keys used for operating the mobile station. The mobile station also includes a battery 60, such as a vibrating battery pack, for powering the various circuits that are required to operate the mobile station, as well as optionally providing mechanical vibration as a detectable output, as described below.

The mobile station 10 can further include an infrared transceiver 61 or other means of data transfer so that data can be shared with other devices such as other mobile stations, car guidance systems, personal computers, printers and the like. The sharing of data, as well as the remote sharing of data, can also be provided according to a number of different techniques. For example, the mobile station may share data via a Radio Frequency Identification (RFID) transponder tag, as such is known to those skilled in the art. Additionally, or alternatively, the mobile station may share data using Bluetooth brand wireless technology developed by the Bluetooth Special Interest Group.

The mobile station can also include memory, such as a subscriber identity module (SIM) 42, a removable user identity module (R-UIM) or the like, which typically stores information elements related to a mobile subscriber. In addition to the SIM, the mobile station 10 can include other memory. In this regard, the mobile station can include volatile memory 62, such as volatile Random Access Memory (RAM) including a cache area for the temporary storage of data. The mobile station can also include other non-volatile memory 64, which can be embedded and/or may be removable, and can also include a cache area for the temporary storage of data. The non-volatile memory can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile station to implement the functions of the mobile station. For example, the memories can include an identifier, such as an international mobile equipment identification (IMEI) code, capable of uniquely identifying the mobile station.

As indicated in the background section, in contrast to the Internet backbone bottleneck (on the end-to-end path), the performance bottleneck of mobile Web applications is at the air interface, so user-perceived latency cannot be effectively improved even if content is cached and served from the access (i.e., cellular) network. Recognizing this fundamental difference, embodiments of the present invention implement the functionality of an edge cache in the mobile station 10, such as in the volatile memory 62 and/or the non-volatile memory 64. Edge caching is a superset of client caching and stores popular content requested by all users. To implement this functionality in the mobile station, the content director 41 is capable of transmitting content requested by one mobile station to other mobile stations, which can cache the content for future reference. More particularly, the content director can be capable of broadcasting content requested by one mobile station to other mobile stations. Alternatively, the content director can advantageously transmit content requested by one mobile station to other mobile stations at any time subsequent to transmitting the content to the requesting mobile station but before the content is requested by any of the other mobile stations. By serving more content from the cache in the mobile station, embodiments of the present invention are capable of reducing radio resource usage and interference in the air interface, as well as facilitate reduced user-perceived latency. Similarly, serving more content from the cache in the mobile station can reduce downlink traffic, mitigate the mismatch between the network architecture and application characteristics, and/or improve dynamic network hot spots generated by user mobility.

The content director 41 can comprise any of a number of devices capable of performing functions in accordance with embodiments of the present invention. For example, the content director can comprise a processor, such as a personal computer, laptop computer, server computer or the like. It should also be noted that, whereas the content director is shown and described herein as comprising a separate element, the content director can be embodied in any of a number of other elements of the system. For example, the functions of the content director can be carried out by the PDSN 32, one or more origin servers 40, and/or any other appropriate element of the system.

In addition to latency and bandwidth efficiency, mobile Web applications must typically also be efficient in mobile station power consumption. To improve mobile station power efficiency, the content director 41 of one advantageous embodiment is capable of transmitting, or multicasting, content to only selected mobile stations 10. To select the mobile stations to send the content, then, the content director is capable of creating and/or maintaining a user interest correlation that defines common interests in the content among different users of the mobile stations. According to this embodiment, the content director is capable of exploiting the user interest correlation to selectively transmit content to only users who are most likely to subsequently request the respective content in the future.

As discussed, extending the edge caching functionality to the mobile station 10 provides a powerful solution to a number of performance, scalability and architectural problems in mobile access networks, because it reduces the use of the slow and error-prone air interface. By its nature, edge content storage is a superset of individual client caching since the edge cache stores popular content requested by all users. Hence, for each mobile station 10 operating according to embodiments of the present invention, some form of prefetching can be performed to download content that is popular among other users but has not been requested locally. However, conventional prefetching techniques that consume additional bandwidth are not desirable because of the prefetching miss penalty on bandwidth usage.

The system of the present invention is capable of implementing the edge caching functionality by using on-demand broadcast. If a user requests a Web object that cannot be served from the mobile station's cache, a request is sent to the origin server 40. When the object, returned by the origin server, arrives in the access (cellular) network, it is broadcast over the air interface to all mobile stations, which store it in their respective caches. Broadcasting to multiple mobile stations can be implemented in any of a number of different manners, such as by sharing the time slot in TDMA, the code in CDMA, and the like. In addition, the content director 41 can advantageously exploit the user interest correlation to perform selective multicast and improve mobile station power efficiency, as discussed below. As such, embodiments of the present invention significantly reduce bandwidth usage because such embodiments eliminate repetitive transmissions of the same content. From the mobile station's perspective, compulsory misses are significantly reduced because a mobile station operating in accordance with embodiments of the present invention sends requests only if no other mobile station has requested the same content (otherwise the content is pulled from the mobile station's cache).

The content director 41 is capable of measuring user interest in any of a number of different manners. In one particularly advantageous embodiment, the user interest correlation is determined based upon the content requested by each mobile station 10 in the system. In this regard, the content director can determine the content requested by each mobile station by receiving and/or creating Web access traces for the mobile stations, as such are well known to those skilled in the art. From the Web access traces, then, the content director can determine the interests of the user of the respective mobile stations, such as equating the interests of the respective users to the content requested by the respective mobile stations.

With the interests of the users of the mobile stations 10 determined, the content director 41 can determine user interest correlation between any given pair of users. Like the user interests, the user interest correlation can be determined in any of a number of different manners. For example, the content director can determine the user interest correlation by computing the probability of one user requesting the same content after another user. This probability, then, can be stored in the content director 41. Thereafter, the content director can use the user interest correlation information to perform selective multicast for every content request to those mobile stations having a user interest correlation that meets a predefined threshold. The average mobile station power consumption is thus effectively reduced because it is proportional to the average multicast group size.

According to one advantageous embodiment, the user interest correlation can be determined using conditional access probability. In this regard, suppose the system includes N mobile stations, and let $p(j|i)$ denote the probability that user j will access a Web object in the future given that user i has previously accessed the same object. Then, let P represent an N-by-N matrix comprised of $p(j|i)$ such that $P_{i,j}=p(j|i)$. As will be appreciated, $P_{i,i}$ can be defined to be zero because the instance of user i accessing a Web object in the future given that the same user i has previously accessed the same object can be equally handled by client caching. Before determining the user interest correlation, the matrix P can be trained. The remaining elements of matrix P can be trained in any of a number of different manners but, in one embodiment, P is trained using historical Web access traces and counting the number of requests that user j makes after user i has made the same request, thereby obtaining $p(j|i)$, for i, j=1, 2, . . . , N, after any appropriate normalization.

Once the matrix P has been trained, the content director 41 of one embodiment of the present invention can perform selective multicasts as follows. The content director first establishes a tunable parameter, referred to as the "multicast factor" $\alpha (0 \leq \alpha \leq 1)$, to control multicast "selectiveness." In one embodiment, for example, the multicast factor $\alpha$ can be set at 0.1. Then, if user i requests a Web object, and $p(j|i)$ is among the largest $(\alpha \times N^2)$ elements in matrix P, then the content director can multicast the content to user j, as well as user i. As will be appreciated, $\alpha=0$ represents the case of unicast (and client caching), and $\alpha=1$ represents the case of broadcast (and edge caching), i.e., every mobile station receives a copy of the requested content. In this regard, the content director is capable of achieving a high hit ratio (close to that of caching using broadcast) with a small $\alpha$ to thereby reduce the multicast group size.

As will be appreciated, the content director 41 can continuously update the matrix P, and thus the user interest correlation information, each time a mobile station 10 requests content. In one embodiment, for example, the content director can continuously receive and/or create Web access traces for the mobile stations as the mobile stations request different Web objects. By continuously updating the user interest correlation information, the content director can include different, subsequently requested content, as well as better calculate the probability that user j will access a Web object in the future given that user i has accessed the same object.

The content director 41 typically pushes the requested content to the mobile station 10 requesting the content as soon as the content is received from the origin server 40. For the other mobile stations, the content director can broadcast, or push, the content in any of a number of different manners. In one embodiment, for example, the content director broadcasts the content to the other mobile stations, or pushes the content to the other mobile stations simultaneously with the content to the requesting mobile station. In another embodiment, for example, the content director can queue the content to be pushed to the other mobile stations as the respective mobile stations initiate an activity on the network, such as by requesting the queued content or some other content. By queuing the content, the other mobile stations need not continuously monitor the network for pushed content but, instead, can receive the content after initiating contact with the network. This latter embodiment is also advantageous in networks that do not physically support broadcast and/or multicast, such as DSL (digital subscriber line) networks.

As indicated, broadcasting to many mobile stations 10 can be accomplished in any number of different manners. For example, embodiments of the present invention are capable of operating in any of a number of mobile, fixed wireless and wireline networks operating, for example, in accordance with CDMA (WCDMA and CDMA2000), TDMA (GSM/GPRS), CSMA (Ethernet and cable networks), FDMA and other multiple access methods. In CDMA networks, for example, embodiments of the present invention are capable of broadcasting content with reduced interference.

Consider a CDMA network that includes many mobile stations 10 connected to a base station 14 via the wireless medium. In such networks, a so-called "near-far" problem often arises in the base station when the signal from mobile stations far away from the base station is overwhelmed by signals from mobile stations nearby. To correct this problem, mobile station power control is typically used so that the signal from one mobile station does not interfere with other mobile stations but still has satisfactory SIR (signal-to-interference ratio) at the base station. With the network operating in accordance with embodiments of the present invention, however, the network can operate with improved power control.

Suppose the network includes mobile stations A, B and C within the same sector of the cell serviced by a base station, as illustrated in FIG. 3. Mobile station A is closer to the base station than either mobile station B or mobile station C. Consequently, signals sent from the base station to mobile stations B or C have a better SIR than mobile station A, and can be decoded with lower bit-error rates. According to embodiments of the present invention, it is possible that all content sent to mobile stations B and C is also received by, and cached in, mobile station A. All this is done without mobile station A sending any messages requesting the content. When mobile station A requests content, then, mobile station A does not need to access the air interface if mobile stations B or C have previously requested the same content. In other words, a higher cache hit ratio in mobile station A reduces mobile station A's use of radio bandwidth. This can be thought of as mobile station A having the "ultimate" power control, in which its transmission power is reduced to zero if the content has been previously requested by a mobile station farther away. Therefore, the average SIR (and quality of service) at the base station for signals from mobile stations B and C can be improved.

Advantageously, embodiments of the present invention not only enhance quality of service for networked applications by improving bandwidth efficiency, but can also add a new dimension in radio resource management for mobile access networks. As known, current research in radio traffic engineering focuses on providing differentiated services for different classes of applications, typically by prioritization. The major limitation of this approach is that it does not work well when network utilization is high, because applications of lower priority are quickly deprived of bandwidth. Accordingly, when network utilization increases, the content director 41 can be configured to multicast requested content more aggressively by increasing the multicast factor a. Increasing the multicast factor can, in turn, facilitate higher mobile station 10 hit ratios and reduce the mobile station's need to use the radio bandwidth. In this regard, the content director can provide a negative feedback mechanism to reduce the possibility of radio resource depletion by offering an optimal and flexible balance between radio bandwidth, terminal storage and power usage. It has been shown that mobile Web requests are extremely correlated among users and, as such, on-demand selective multicast can dramatically improve radio resource management in high network utilization scenarios.

To further improve the bandwidth-delay-battery balance, the content director 41 can additionally exploit mobile station 10 state information and multicast content to active terminals only. Additionally, or alternatively, the content director can integrate terminal power condition, or battery information, into the multicast decision if such information is available. For example, the content director can push content to a mobile station more aggressively when the mobile station is connected to AC power, and push content more conservatively when the mobile station battery power falls below a certain threshold.

As will be appreciated by those skilled in the art, the user interest correlation can be utilized in any of a number of different manners, including selective multicast, as described herein. For example, the user interest correlation can be utilized for statistical profiling users of the mobile stations 10 of the system based upon the user interest correlations. Also, for example, the user interest correlation can be utilized to match users of two or more mobile stations based upon common user interests. In this regard, the content director 41 can utilize the user interest correlation for such other purposes or, alternatively, transmit the user interest correlation to another element, such as an origin server 40, that can utilize the user interest correlation for such other purposes.

As described below, performance of the system of one embodiment of the present invention will be analyzed in a slotted ALOHA system, as such is well known to those skilled in the art. For purposes of analysis, although each mobile station 10 will have a finite capacity of memory, it is assumed that the mobile stations have caches of infinite capacity. Such an assumption is plausible for purposes of analysis due to the fact that the latest generation of flash memory and miniature hard disk drives have capacities that are orders of magnitude larger than the content an average mobile user downloads daily, and it is expected that the capacity of such memory will continue to grow in the foreseeable future. Further, such an assumption is plausible because embodiments of the present invention that use selective push significantly reduce the amount of content a cache needs to store, as compared to broadcasting. As a result, it is not necessary to explicitly model the cache replacement policy; instead, hit ratio is used to capture caching effectiveness.

For simplicity, also presume that both content-request and reply messages are of fixed and same size. Now, presume the system includes N mobile stations 10 (N>>1). Each mobile station independently sends new requests to an origin server 40 via a shared channel at a Poisson rate of $\lambda/N$, so the aggregate new request rate is $\lambda$. The link capacity of both uplink (multiple access) and downlink (broadcast capable) is one message/slot, and the request message is transmitted to the server only when no other mobile stations are attempting to transmit messages. After receiving the request, the server immediately sends a reply message of the same size to the user via downlink. Collisions only take place in the uplink.

If a collision occurs, the request is retransmitted in each subsequent time slot with probability $q_r$ until it is successfully transmitted. Without loss of generality, it can be assumed that the mobile station knows whether the transmission is successful or not at the end of the time slot.

As the total offered load G on the network is comprised of both new arrivals and retransmissions, it can be shown that $G \geq \lambda$. The throughput of the slotted ALOHA system, then, can be represented as $T(G)=G \times e^{-G}$. In this regard, FIG. 4 depicts the throughput T(G) as a function of the offered load G. As shown, the throughput reaches a maximum of 1/e when the total offered load G equals one. Further, at stable equilibrium, the new request rate $\lambda$ equals the throughput such that $\lambda = G \times e^{-G}$. As also shown, the slotted ALOHA system has two equilibrium points for a new arrival rate of $\lambda$. For purposes of analysis, focus will be drawn to the stable equilibrium point. For further details regarding standard assumptions as well as rigorous analysis of slotted ALOHA systems, see D. BERTSEKAS & R. GALLAGER, DATA NETWORKS (2nd ed. 1992).

To analyze the performance of the system of the present invention, first consider a conventional cellular system (referred to herein as the "Baseline"). Although content transmitted to one mobile station 10 is not stored in other mobile stations in Baseline, this system can perform client caching at the mobile station. As such, the new arrival rate is the rate at which user requests result in client cache misses.

The expected delay can be computed in a successful request transmission in Baseline, which has a new request arrival rate of $\lambda$ and an offered load of G. In this regard, a request is successfully transmitted in the immediately available time slot if there is no other mobile station 10 attempting transmission, which occurs with an approximate probability of $e^{-G}$ if N>>1, as in the present case. Taking the converse, then, the mobile station has to retransmit with a probability of $1-e^{-G}$.

In the retransmission phase, the mobile station 10 retransmits with probability $q_r$ in each time slot. As such, the probability of successful retransmission for a specific mobile station in slot t can be determined according to the following:

$P_{succ}$=Probability that only mobile station i sends a request in slot $t=q_r \times$Probability that no other mobile stations sends a request in slot $t \approx q_r \times e^{-G}$ \hfill (1)

Also, the expected time for a successful retransmission, $E[T_r]$, can be represented as:

$$E[T_r] = \frac{1}{P_{succ}} = \frac{1}{q_r} e^G$$

Combining the new arrival and retransmission phases, and noting that the origin server 40 reply arrives on the next time slot of a successful request transmission, the expected user-perceived network latency, $E[T_B]$, can be determined as follows:

$$E[T_B] = 2 + \frac{e^G - 1}{q_r} \qquad (2)$$

Now that the expected user-perceived network latency for Baseline has been determined, the expected time for a request transmission can be determined according to one embodiment of the present invention. In this regard, embodiments of the present invention have two key improvements relative to Baseline. The first improvement, caching, is straightforward: according to embodiments of the present invention some of the requests can be served immediately from the mobile station 10 cache because other mobile stations have previously made the same requests. This results in zero latency (excluding latency incurred in the mobile station), in contrast to Baseline's round-trip latency, which is at least two time slots. The second improvement is the fact that embodiments of the present invention permit faster medium access due to reduced medium contention, which can be referred to as the "medium contention reduction effect." Having identified the two key improvements, the performance improvement brought by these two effects can be quantified as described below.

Assume that the hit ratio of the mobile station 10 according to the system of one embodiment is h. In this regard, the request will be put on the multiple access medium with a probability of 1−h. Consequently, the new arrival rate at the medium according to the present invention, $\lambda_M$, can be represented as:

$$\lambda_M = \lambda \times (1-h) \quad (3)$$

where $\lambda$ is the new arrival rate in Baseline. The offered load according to the present invention, $G_M$, can then be found by solving the following equation:

$$\lambda_M = G_M \cdot e^{-G_M} \quad (4)$$

The expected time for successful request transmission, $E[T_M]$, according to the present invention can be derived from equation (2) by replacing G with $G_M$ and considering that only non-cached requests are put on the medium. Thus, the expected time for successful request transmission, $E[T_M]$, can be represented as follows:

$$E[T_M] = \left(2 + \frac{\exp(G_M) - 1}{q_r}\right) \cdot (1 - h) \quad (5)$$

Reference is now drawn to FIG. 5, which illustrates the effectiveness of this embodiment of the present invention (represented as "ACME") on latency reduction by computing equation (5). As shown, hit ratios are varied from 20% to 80%, with Baseline represented as a special case of a zero hit ratio. As also shown, the retransmission probability $q_r$ is fixed at 0.5. FIG. 5A depicts the expected round-trip latency for the present invention and Baseline against different new arrival rates. One straightforward observation is that the latency decreases as the hit ratio of the system according to the present invention improves. More specifically, when the system is lightly loaded, medium contention rarely occurs, and improvement of the present invention is mostly due to locally caching content (i.e., the (1−h) term in equation (5)). As the load of the system increases, the probability of collision increases, and caching additionally reduces contentions and retransmissions, improving latency even in the case of cache misses. This medium contention reduction effect can be quantified by the following term from equation (5):

$$\left(2 + \frac{\exp(G_M) - 1}{q_r}\right)$$

In a heavily loaded system, therefore, improvements in performance provided by embodiments of the present invention are much more than just serving requests locally. Under the optimal new arrival rate of 1/e, the expected round-trip latency in Baseline is 4.82 time slots, while it is 0.95 time slots according to the present invention with a 60% hit ratio. This represents an acceleration of four times. If latency reduction were solely due to caching, then latency according to the present invention would have been 1.93 time slots (acceleration of 1.5 times). The medium contention and interference reduction effect of the present invention is as powerful as its caching effect when the system experiences a heavy load.

Reference is now drawn to FIG. 5B, which depicts user-perceived acceleration $E[T_B]/E[T_M]$ at different hit ratios to evaluate the user perceived latency improvement of the present invention over Baseline. Again, the curves would be parallel to the x-axis if there were no medium contention reduction. As shown, the slope of the curves becomes steeper as the new arrival rate increases, confirming that the medium contention reduction effect is more pronounced under heavy load, as earlier indicated. At 80% hit ratio, for example, the system according to this embodiment of the present invention operates with an acceleration of about 10 times in a maximum loaded system, half of which is contributed by the medium contention reduction effect.

Having analyzed performance of one embodiment of the present invention with respect to user-perceived latency and acceleration, performance of another embodiment of the present invention including the user interest correlation and selective multicasting, will now be analyzed. For purposes of analysis, a number of historical Web access traces have been taken to represent past, as well as future, requested content by a number of mobile stations 10. In this regard, consider a first trace that includes 300,000 accesses from 2,155 Internet Protocol (IP) addresses (identifying the respective mobile station). Also, consider a second trace that includes 437,861 accesses from 553 mobile stations, as well as a third trace that includes 878,085 accesses from 127 mobile stations. As used herein, the first and second traces can be considered as access network logs since they are quite constrained in terms of user set, access method and user physical locations. The third trace, on the other hand, includes requests from both clients and downstream proxies.

Next, trace-driven simulations can be performed to evaluate the relation between caching performance and mobile station 10 power consumption of this embodiment of the present invention. To quantitatively measure the performance of the present invention, it is noted that the hit ratio according to the present invention is upper-bounded by edge caching using broadcast (i.e., $\alpha=1$) and lower-bounded by client caching using unicast (i.e., $\alpha=0$). As such, the hit ratio according to this embodiment is also dependent on the multicast factor $\alpha$. So we define the effectiveness of the system operating according to this embodiment of the present invention, $E(\alpha)$, as:

$$E(\alpha) = \frac{H_D(\alpha) - H_C}{H_B - H_C}$$

where $H_D(\alpha)$ is the hit ratio of the system of the present invention with multicast factor $\alpha$, and $H_B$ and $H_C$ are the hit ratios for edge caching using broadcast and client caching using unicast, respectively. Obviously, $E(\alpha)$ is an increasing function of $\alpha$ and is bounded by zero and one, $0 \leq E(\alpha) \leq 1$, with $E(0)=0$ and $E(1)=1$. This normalized performance metric is very convenient for purposes of analysis because performance of the system of the present invention can be compared in different traces even if they have dramatically different $H_C$, $H_B$ and $H_D(\alpha)$ values, as shown in Table 1 below.

TABLE 1

|  | Trace 1 | Trace 2 | Trace 3 |
|---|---|---|---|
| N(No. Users) | 2155 | 553 | 127 |
| $H_C$ | 13.34% | 78.8% | 12.5% |
| $H_B$ | 34.55% | 86.9% | 19.2% |
| $H_D(\alpha_{0.5})$ | 23.95% | 82.9% | 15.9% |
| $\alpha_{0.5}$ | 0.0055 | 0.02 | 0.053 |
| S(1) | 1585.5 | 337.6 | 116.3 |
| $S(\alpha_{0.5})$ | 10.96 | 9.01 | 6.74 |
| $s(\alpha_{0.5})$ | 0.0069 | 0.0267 | 0.0580 |

Furthermore, it can be shown that average mobile station 10 power consumption is proportional to average multicast group size, $S(\alpha)$. Therefore, group size $S(\alpha)$ can be used to represent average mobile station power consumption. As shown below, the broadcast group size $S(1)$ is proportional to the number of users, and varies greatly among traces. To compare the group size between different traces, a relative average multicast group size, $s(\alpha)$, can be defined as follows:

$$s(\alpha) = \frac{S(\alpha)}{S(1)}$$

Thus, $s(\alpha)$ is the group size relative to that of broadcast, and is also an increasing function of $\alpha$.

Now, $E(\alpha)$, $S(\alpha)$ and $s(\alpha)$ can be determined from the three traces described above. Before determining $E(\alpha)$, $S(\alpha)$ and $s(\alpha)$, however, matrix P can be trained for each trace such as, for example, by using the odd-numbered accesses in the analyzed traces, and counting the number of requests that user j makes after user i to obtain p(j|i), for i, j=1, 2, . . . , N, after proper normalization. For example, proper normalization can be accomplished row-wise such that p(1|i)+p(2|i)+ . . . +p(N|i) equals one. Thus, given that user i has accessed content, p(j|i) gives the probability that user j will access the same content again. Thereafter, the even-numbered accesses in the analyzed traces can be used to determine $E(\alpha)$, $S(\alpha)$ and $s(\alpha)$.

With matrix P in place, each trace (even numbered accesses of each trace) can be run through the system of the present invention to measure the hit ratios under different multicast factors $\alpha$. The effectiveness $E(\alpha)$ can then be computed based on $H_D(\alpha)$, $H_B$ and $H_C$. The group size $S(\alpha)$ can be obtained by counting the number of mobile stations 10 receiving the multicast for all requested objects, and $s(\alpha)$ can be computed by normalization.

Table 1 above lists S(1), the measured broadcast group size. As shown, S(1) does follow the number of users in the network, N. For example, S(1) is 117 in the third trace, which has 127 users. In the first trace, which has 2155 users, S(1) is 1586. Such a property is consistent with the notion that the system operating according to this embodiment of the present invention with broadcast, while implementing full-fledged edge cache functionality in the mobile station 10, incurs O(N) mobile station energy cost.

Reference is now drawn to FIG. 6, which depicts effectiveness $E(\alpha)$ against relative multicast group size $s(\alpha)$ by varying $\alpha$ from 0 to 1 for all three traces. In FIG. 6 (as well as in Table 1 above), $\alpha_{0.5}$ represents the value of $\alpha$ when the system of this embodiment of the present invention achieves 50% effectiveness, i.e., the median hit ratio between client caching and edge caching. The effectiveness of the present invention is evident from the figure, as $E(\alpha)$ increases rapidly with a very small group size increase. In all three traces, 80% effectiveness is achieved at a relative multicast group size smaller than 20%. Furthermore, this embodiment of the present invention achieves 50% effectiveness when the relative multicast group size is as small as 0.7% (first trace) to 6% (third trace) of the broadcast group size. The average multicast group size ranges from 6.74 (third trace) to 10.96 (first trace). The reduction in average mobile station power consumption is calculated as $1/s(\alpha_{0.5})$, and the present invention reduces the mobile station power consumption by 17 (third trace) to 144 times (first trace) while maintaining 50% effectiveness.

Another interesting observation is that $s(\alpha_{0.5})$ decreases with the increasing number of users among the three traces, indicating that the multicast group size $S(\alpha_{0.5})$ is much less sensitive than the broadcast group size to the vastly different number of users in the three traces. Indeed, $S(\alpha_{0.5})$ increases only 62%, from 6.74 to 10.96, as N increases 16 times from 127 in the third trace to 2,155 in the first trace. This may be explained by the fact that, for a given user, the user interest in content can be best represented by a small group of users whose interests are closest to the respective given user's interest. The size of this interest group grows much slower than the general user group because it only keeps the users with the closest interest in the general user group, and identifying this group can help to create very scalable and efficient content multicast systems.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of delivering content over a communications system, wherein the communications system comprises a plurality of terminals capable of communicating via a communications network, the method comprising:

requesting content at a terminal of the plurality of terminals, wherein the plurality of terminals are capable of requesting, and thereafter receiving, content, and wherein each terminal includes a cache for storing data;

delivering the content to the terminal based upon the request, and thereafter delivering the content to at least one other terminal of the communications system before the at least one other terminal requests the content, wherein a plurality of the other terminals each have a user interest correlation with the terminal requesting the content, wherein the content is delivered to the at least one other terminal in response to the content requested at the terminal, and based upon the user interest correlation of the at least one other terminal with the terminal requesting the content, at least one other terminal to which the content is delivered having the user interest correlation with respect to the terminal requesting the content meeting a predefined threshold; and storing the content in the cache of each of the at least one other terminal upon delivery of the content to the at least one other terminal.

2. A method according to claim 1, wherein delivering the content comprises:

retrieving the content from cache when the content is stored in the cache of the respective terminal; and transmitting a request to an origin server when the content is not stored in the cache, and thereafter delivering the content to the terminal from the origin server based upon the request, and delivering the content to at least one other terminal of the system before the at least one other terminal requests the content.

3. A method according to claim 1, each terminal has an associated user interest correlation with each other terminal.

4. A method according to claim 1 further comprising creating a user interest correlation for each terminal with respect to each other terminal, wherein the user interest correlation is created based upon content requested by the respective terminals.

5. A method according to claim 4, wherein creating a user interest correlation based upon content requested by the respective terminal comprises at least one of receiving and creating Web access traces from content requested by the respective terminal to thereby determine the content requested by the respective terminal.

6. A method according to claim 4, wherein creating a user interest correlation for each terminal with respect to each other terminal comprises computing a probability of the terminal requesting content after each other terminal requests the content.

7. A method according to claim 6, wherein computing a probability comprises computing a conditional access probability for each terminal with respect to each other terminal.

8. A method according to claim 1, wherein delivering the content further comprises decreasing the predefined threshold when utilization of the communications network increases.

9. A method according to claim 1, wherein delivering the content to at least one other terminal comprises delivering the content to at least one other, active terminal.

10. A method according to claim 1, wherein delivering the content to at least one other terminal comprises delivering the content to at least one other terminal based upon a power condition of the at least one other terminal.

11. A method according to claim 1, wherein delivering the content to at least one other terminal comprises delivering the content to at least one other terminal when the at least one other terminal initiates an activity on the communications network.

12. A communications system comprising:

a plurality of terminals adapted to communicate via a communications network, wherein each of the plurality of terminals is capable of requesting and thereafter receiving content via the communications network, and wherein each of the plurality of terminals includes a cache for storing data; and a content director capable of receiving a request for content from one terminal, wherein the content director is capable of pushing the content to the terminal based upon the request, and capable of pushing the content to at least one other terminal before the at least one other terminal requests the content, wherein each of the at least one other terminal has a user interest correlation with the terminal requesting the content, wherein the content is pushed to the at least one other terminal in response to the content request received by the content director, and based upon the user interest correlation of the at least one other terminal with respect to the terminal requesting the content, at least one other terminal to which the content is delivered having the user interest correlation with respect to the terminal requesting the content meeting a predefined threshold, and wherein the cache of each of the at least one other terminal is capable of storing the content upon the push of the content to the at least one other terminal.

13. A communications system according to claim 12, wherein each terminal is capable of retrieving the content from cache when the content is stored in the cache of the respective terminal, wherein each terminal is capable of transmitting a request for content when the content is not stored in the cache, wherein the system further comprises:

an origin server capable of receiving the request from the terminal, and thereafter transmitting the requested content through to the content director such that the content director can push the content to the terminal based upon the request, and push the content to at least one other terminal before the at least one other terminal requests the content.

14. A communications system according to claim 12, wherein each terminal has an associated user interest correlation with each other terminal.

15. A communications system according to claim 12, wherein the content director is capable of creating a user interest correlation for each terminal with respect to each other terminal, wherein the user interest correlation is created based upon content requested by the respective terminal.

16. A communications system according to claim 15, wherein the content director is capable of creating a user interest correlation based upon content requested by the respective terminal by at least one of receiving and creating Web access traces from content requested by the respective terminal to thereby determine the content requested by the respective terminal.

17. A communications system according to claim 15, wherein the content director is capable of creating the user interest correlation for each terminal with respect to each other terminal by computing a probability of the terminal requesting content after each other terminal requests the content.

18. A communications system according to claim 17, wherein the content director is capable of computing a conditional access probability for each terminal with respect to each other terminal.

19. A communications system according to claim 12, wherein the content director is also capable of decreasing the predefined threshold when utilization of the communications network increases.

20. A communications system according to claim 12, wherein the content director is capable of delivering the content to at least one other, active terminal.

21. A communications system according to claim 12, wherein the content director is capable of delivering the content to at least one other terminal based upon a power condition of the at least one other terminal.

22. A communications system according to claim 12, wherein the content director is capable of delivering the content to at least one other terminal when the at least one other terminal initiates an activity on the communications network.

23. A communications system comprising:
a data network comprising at least one origin server;
a cellular network in electrical communication with the data network, wherein the cellular network comprises:
- a content director capable of receiving a request for content from a terminal and thereafter receiving the content from at least one origin server via the data network, wherein the content director is capable of pushing the content to the terminal via the cellular network based upon the request, and capable of pushing the content via the cellular network to at least one other terminal before the at least one other terminal request the content, each of the at least one other terminal including a cache for storing the content upon the push of the content to the at least one other terminal, and
- wherein the content director is capable of pushing the content to at least one other terminal based upon a user interest correlation of the at least one other terminal with respect to the terminal requesting the content, at least one other terminal to which the content is pushed having the user interest correlation with respect to the terminal requesting the content meeting a predefined threshold.

24. A communications system according to claim 23 further comprising a plurality of terminals, wherein each terminal is capable of requesting and thereafter receiving content from the at least one origin server.

25. A communications system according to claim 24, wherein each terminal includes a cache for storing data, wherein each terminal is capable of retrieving requested content from cache when the content is stored in the cache of the respective terminal, wherein each terminal is capable of transmitting a request for content when the content is not stored in the cache.

26. A communication system according to claim 23, wherein each terminal has an associated user interest correlation with each other terminal.

27. A communications system according to claim 26, wherein the content director is capable of creating a user interest correlation for each terminal with respect to each other terminal, wherein the user interest correlation is created based upon content requested by the respective terminal.

28. A communications system according to claim 27, wherein the content director is capable of creating the user interest correlation for each terminal with respect to each other terminal by computing a probability of the terminal requesting content after each other terminal requests the content.

29. A communication system according to claim 23, wherein the content director is also capable of decreasing the predefined threshold when utilization of the communications network increases.

* * * * *

UNITED STATES PATENT AND TRADEMARK OFFICE
CERTIFICATE OF CORRECTION

| | | |
|---|---|---|
| PATENT NO. | : 7,039,672 B2 | Page 1 of 1 |
| APPLICATION NO. | : 10/409284 | |
| DATED | : May 2, 2006 | |
| INVENTOR(S) | : Wu et al. | |

It is certified that error appears in the above-identified patent and that said Letters Patent is hereby corrected as shown below:

Column 17,
Line 17, after "1," insert --wherein--.

Column 19,
Line 7, after "from" insert --the--.

Signed and Sealed this

Ninth Day of January, 2007

JON W. DUDAS
*Director of the United States Patent and Trademark Office*